US010652878B2

(12) United States Patent
Costa et al.

(10) Patent No.: US 10,652,878 B2
(45) Date of Patent: May 12, 2020

(54) METHOD AND APPARATUS FOR TRANSMITTING CONTROL INFORMATION IN A WIRELESS COMMUNICATION NETWORK

(71) Applicant: Huawei Technologies Co., Ltd., Shenzhen, Guangdong (CN)

(72) Inventors: Mario Costa, Helsinki (FI); Petteri Kela, Helsinki (FI); Xavier Gelabert, Kista (SE)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

(21) Appl. No.: 16/152,175

(22) Filed: Oct. 4, 2018

(65) Prior Publication Data
US 2019/0037548 A1 Jan. 31, 2019

Related U.S. Application Data

(63) Continuation of application No. PCT/EP2016/057488, filed on Apr. 6, 2016.

(51) Int. Cl.
H04W 72/04 (2009.01)
H04L 5/00 (2006.01)
(Continued)

(52) U.S. Cl.
CPC ........ H04W 72/042 (2013.01); H04B 7/0452 (2013.01); H04B 7/0456 (2013.01);
(Continued)

(58) Field of Classification Search
CPC .. H04B 7/0456; H04B 7/0452; H04B 7/0617; H04L 5/0051; H04L 5/0053;
(Continued)

(56) References Cited

U.S. PATENT DOCUMENTS 8,228,809 B1 * 7/2012 Xing ................... H04W 72/046
370/252
9,088,323 B2 7/2015 Park et al.
(Continued)

FOREIGN PATENT DOCUMENTS

| CN | 104012019 A | 8/2014 |
| CN | 104205672 A | 12/2014 |
| CN | 105191236 A | 12/2015 |

OTHER PUBLICATIONS

International Search Report for PCT/EP2016/057488, dated Oct. 12, 2017. (Year: 2017).*
(Continued)

Primary Examiner — Benjamin H Elliott, IV
(74) Attorney, Agent, or Firm — Fish & Richardson P.C.

(57) ABSTRACT

An access node in a wireless communication system includes a transceiver configured to receive one or more uplink pilots associated with a user node via a radio link, and a processor configured to determine, based on the one or more uplink pilots, a location of the user node and whether the radio link is a line of sight radio link or a non-line of sight radio link. When the radio link is a line of sight radio link, the processor determines a position based precoding vector based on the location of the user node, and generates a precoded downlink control signal based on the determined position based precoding vector. The transceiver transmits the precoded downlink control signal to the user node.

20 Claims, 10 Drawing Sheets

(51) Int. Cl.
*H04B 7/06* (2006.01)
*H04B 7/0452* (2017.01)
*H04L 25/03* (2006.01)
*H04L 25/02* (2006.01)
*H04B 7/0456* (2017.01)

(52) U.S. Cl.
CPC ......... *H04B 7/0617* (2013.01); *H04L 5/0051* (2013.01); *H04L 5/0053* (2013.01); *H04L 25/0204* (2013.01); *H04L 25/0224* (2013.01); *H04L 25/03343* (2013.01); *H04W 72/0453* (2013.01)

(58) Field of Classification Search
CPC ............. H04L 25/0204; H04L 25/0224; H04L 25/03343; H04W 72/042; H04W 72/0453
See application file for complete search history.

(56) References Cited

U.S. PATENT DOCUMENTS

| | | | | |
|---|---|---|---|---|
| 2008/0165728 | A1* | 7/2008 | Liu | H04B 7/0617 370/329 |
| 2013/0107915 | A1 | 5/2013 | Benjebbour et al. | |
| 2014/0071952 | A1* | 3/2014 | Kim | H04L 5/001 370/335 |
| 2014/0099971 | A1 | 4/2014 | Lim et al. | |
| 2015/0288483 | A1* | 10/2015 | Sun | H04L 1/0003 370/329 |
| 2016/0043883 | A1 | 2/2016 | Zirwas | |
| 2016/0073383 | A1 | 3/2016 | Han et al. | |
| 2016/0277132 | A1* | 9/2016 | Pratt | H04B 17/373 |
| 2017/0367111 | A1* | 12/2017 | Gelabert | H04W 72/042 |
| 2018/0076881 | A1* | 3/2018 | Zhu | H04B 7/204 |
| 2018/0234157 | A1* | 8/2018 | Liang | H04B 7/15507 |
| 2019/0037548 | A1* | 1/2019 | Costa | H04B 7/0452 |

OTHER PUBLICATIONS

Hakkarainen et al., "High-Efficiency Device Localization in 5G Ultra-Dense Networks: Prospects and Enabling Technologies", 2015 IEEE 82nd Vehicular Technology Conference (VTC Fall), Sep. 2015, 5 pages.

Sesia et al., "LTE—The UMTS Long Term Evolution: From Theory to Practice", Second Edition, John Wiley and Sons, Ltd., 2011, 794 pages.

Werner et al., "Joint User Node Positioning and Clock Offset Estimation in 5G Ultra-Dense Networks", IEEE Global Communications Conference (GLOBECOM), Dec. 2015, 7 pages.

Office Action issued in Chinese Application No. 201680084353.1 on Mar. 9, 2020, 11 pages (with English translation).

* cited by examiner

METHOD AND APPARATUS FOR TRANSMITTING CONTROL INFORMATION IN A WIRELESS COMMUNICATION NETWORK

CROSS-REFERENCE TO RELATED APPLICATIONS

This application is a continuation of International Application No. PCT/EP2016/057488 filed on Apr. 6, 2016, the disclosure of which is hereby incorporated by reference in its entirety.

TECHNICAL FIELD

The aspects of the present disclosure relate generally to wireless communications and in particular to exchanging control information among nodes in a wireless communication network.

BACKGROUND

The number of mobile devices or user nodes desiring service from wireless communication systems is expected to increase dramatically in the coming years, and the amount of control information used to coordinate and control these user nodes will increase proportionally. Control channels, which are predetermined or agreed upon radio resources used for exchanging control information, reduce the radio resources available for data transmission. Thus it is desirable to optimize or minimize the amount of radio resources used for control information within a wireless communication network.

Conventional wireless communication systems based on current standards, such as Long Term Evolution (LTE), employ non-precoded control channels. This results in a single data stream in each element of a downlink control channel targeted to a particular user node or broadcast to a group of user nodes. For example, in LTE, the downlink control data is appended, prior to transmission, with a cyclic-redundancy check (CRC) that has been scrambled with the user node identity. This allows a user node to identify its own data without the need for additional payload. However, this scheme does not allow exploiting a single time-frequency radio resource to send multiple control data streams to different user nodes.

Multiple-input multiple-output (MIMO) systems, where either or both of the access node and user node are equipped with multiple antennas, make it possible to multiplex multiple data streams over the same time-frequency or time-frequency-code radio resources by exploiting the multiple transmissions paths, or layers, provided by the MIMO systems. Typical multi-user MIMO schemes rely on accurate and timely channel state information (CSI) at the transmitter (CSIT) to achieve the benefits of MIMO transmission. Accurate CSI is achieved by channel sounding or transmitting reference signals, often referred to as pilot symbols or pilots, interleaved with the data so the receiver can measure and estimate the channel. The pilots need to be sent often enough to account for changing channel conditions to allow reliable decoding of data at each receiver. Also, the CSI, or CSIT needs to be acquired across the full allocated frequency band of the downlink data transmission for the channel estimation to be accurate. Repeatedly sending pilot symbols across the full frequency band requires significant radio resources. The requirements in terms of transmit power scale with bandwidth while the requirements in terms of radio resources used for the uplink pilot symbols scales with the number of user nodes. Thus the number of user nodes that can be served by an access node may be limited by the available sounding resources and control channel capacities.

Thus there is a need for improved methods and apparatus for managing and transmitting control information in wireless communication systems.

SUMMARY

On the above background it is an object of the present embodiments of the invention to provide apparatus and methods to improve the spectral efficiency of downlink control channels while improving the efficiency with which uplink pilot resources are used. Thus, the number of user nodes connected to an access node can be increased in a crowded wireless communication system. This object is solved by the subject matter of the independent claims. Further advantages and embodiments can be found in the dependent claims.

According to a first aspect of the present embodiment of the invention the above and further objects and advantages are obtained by an access node that includes a transceiver and a processor. The transceiver is configured to receive one or more uplink pilots associated with a user node via a radio link. The processor is configured to determine, based on the one or more uplink pilots, a location of the user node and whether the radio link is a line of sight radio link or a non-line of sight radio link. When the radio link is a line of sight radio link, the processor determines a position based precoding vector based on the location of the user node, and generates a precoded downlink control signal based on the determined position based precoding vector. The transceiver transmits the precoded downlink control signal to the user node.

In a first possible implementation form of the access node according to the first aspect, the precoded downlink control signal includes a set of transmission frequency resources and the one or more uplink pilots include a set of sounding frequency resources, where the set of sounding frequency resources has fewer frequency resources than the set of transmission frequency resources. This implementation form reduces the number of uplink pilots required by having the sounding frequency resources smaller than the transmission frequency resources.

In a second possible implementation form of the access node according to the first aspect as such or to the first possible implementation form of the first aspect the set of transmission frequency resources comprises one or more frequency resources not present in the set of sounding frequency resources. This implementation form allows uplink pilots to be transmitted on different frequency resources than the frequency resources being used for transmission of control information.

In a third possible implementation form of the access node according to the first aspect as such or to the first or second possible implementation forms of the first aspect when the radio link is the non-line of sight radio link, the processor determines a channel estimate based on the one or more uplink pilots, determines a channel based precoding vector based on the channel estimates, and precodes the precoded downlink control signal based on the channel based precoding vector. The set of sounding frequency resources comprises the set of transmission frequency resources. This implementation form provides additional flexibility by including channel based precoding techniques along with position based precoding techniques in the same control channel.

In a fourth possible implementation form of the access node according the first aspect as such or to the first through third possible implementation forms of the first aspect the processor generates a hybrid channel matrix. The hybrid channel matrix includes the location of the user node and a set of channel estimates. The transceiver transmits a spatially multiplexed radio resource to one or more user nodes, wherein the spatially multiplexed radio resource includes the precoded downlink control signal and a precoded data signal. This implementation form provides a channel matrix that can support selection of both channel based precoding vectors or position based precoding vectors and allows both control information and payload data to be transmitted on the same radio resource.

In a fifth possible implementation form of the access node according to the first aspect as such or to the first through fourth possible implementation forms of the first aspect the transceiver receives a pilot request from the user node that includes a request to schedule transmission of at least one uplink pilot, and sends a downlink control signal to the user node. The downlink control signal includes information for scheduling transmission of the one or more uplink pilots. This implementation form has the advantage of allowing a user node to request scheduling of uplink pilots thereby allowing the user node to determine when uplink pilots are necessary and offloading the access node of this processing.

In a sixth possible implementation form of the access node according to the first aspect as such or to the first through fifth possible implementation forms of the first aspect the transceiver transmits a first downlink control signal that includes information for decoding of the precoded downlink control signal. This implementation form provides the advantage of having the access node to provide decoding information to the user node thereby allowing the access node to change how downlink control information is encoded on the fly to adapt to changing radio conditions.

In a seventh possible implementation form of the access node according to the first aspect as such or to the sixth possible implementation form of the first aspect the first downlink control signal includes time-frequency resource assignments and transmits power assignments for the one or more uplink pilots. This implementation form provides the advantage of allowing the access node to change certain aspects of the downlink control signals on the fly.

In an eighth possible implementation form of the access node according to the first aspect as such or to the sixth or seventh possible implementation forms of the first aspect the first downlink control signal includes an indication of an antenna element to be used for transmitting the one or more uplink pilots. This implementation form provides the advantage for the access node to select the desired antenna to be used by the user node for transmitting the uplink pilots.

In a ninth possible implementation form of the access node according to the first aspect as such or to any of the first through eighth possible implementation forms of the first aspect the processor determines the position based precoding vector based on a synthesized channel matrix wherein the synthesized channel matrix includes one or more line of sight radio links. This implementation form provides the advantage of having the access node generate a channel matrix based on user node positions rather than relying on more complex channel estimation techniques.

In a tenth possible implementation form of the access node according to the first aspect as such or to any of the first through ninth possible implementation forms of the first aspect when the radio link is the non-line of sight radio link, the processor schedules a plurality of uplink pilots for the user node, wherein the plurality of uplink pilots includes the set of transmission frequency resources. The transceiver transmits a channel based precoded downlink control signal to the user node and broadcasts a non-precoded downlink control signal to a plurality of user nodes. This implementation form provides the advantage of having the access node use both channel based precoding to send control signals to a specific user node and non-precoded control signals to broadcast control information to multiple user nodes.

In an eleventh possible implementation form of the access node according to the first aspect as such or to the first through tenth possible implementation forms of the first aspect the processor is configured to include in the downlink control signal an uplink pilot information. The uplink pilot information includes one or more of an indication of the number of uplink pilots to be transmitted and the radio resources to be used for transmitting the uplink pilots. This implementation form provides the advantage of allowing the access node to use downlink control signals to specify how the user node should transmit uplink pilots.

In a twelfth possible implementation form of the access node according to the first aspect as such or to any of the preceding first through eleventh possible implementation forms of the first aspect the downlink control signal comprises an indication of whether the uplink pilots should be transmitted periodically. This implementation form reduces the amount of downlink control information required by scheduling continuing uplink pilot transmissions with a single control signal.

According to a second aspect of the present embodiment of the invention the above and further objects and advantages are obtained by a method for transmitting control information in an access node. The method includes receiving one or more uplink pilots from a user node via a radio link, and determining, based on the one or more uplink pilots a location of the user node, and whether the radio link is a line of sight radio link or a non-line of sight radio link. When the radio link is the line of sight radio link, the method includes determining a position based precoding vector based on the location of the user node, precoding a downlink control signal based on the determined position based precoding vector, and transmitting the precoded downlink control signal to the user node.

In a first possible implementation form of the method according to the second aspect the method includes generating a hybrid channel matrix, wherein the hybrid channel matrix includes the location of the user node and a set of channel estimates, and transmitting a spatially multiplexed radio resource to one or more user nodes, wherein the spatially multiplexed radio resource comprises a location based precoded downlink control signal and a location based precoded data signal. This implementation form provides a channel matrix that can support selection of both channel based precoding vectors or position based precoding vectors and allows both control information and payload data to be transmitted on the same radio resource.

According to a third aspect of the present embodiment of the invention the above and further objects and advantages are obtained by a non-transient computer readable storage medium having stored thereon program instructions that when executed by a processor causes the processor to perform the method according to the method of the second aspect as such or according to the first implementation form of the method of the second aspect.

These and other aspects, implementation forms, and advantages of the exemplary embodiments will become apparent from the embodiments described herein considered in conjunction with the accompanying drawings. It is to be understood, however, that the description and drawings are designed solely for purposes of illustration and not as a definition of the limits of the disclosed embodiments of the invention, for which reference should be made to the appended claims. Additional aspects and advantages of the embodiments of the invention will be set forth in the description that follows, and in part will be obvious from the description, or may be learned by practice of the embodiments of the invention. Moreover, the aspects and advantages of the embodiments of the invention may be realized and obtained by means of the instrumentalities and combinations particularly pointed out in the appended claims.

BRIEF DESCRIPTION OF THE DRAWINGS

In the following detailed portion of the present disclosure, the embodiments of the invention will be explained in more detail with reference to the example embodiments shown in the drawings, in which.

DETAILED DESCRIPTION

Figure 1:
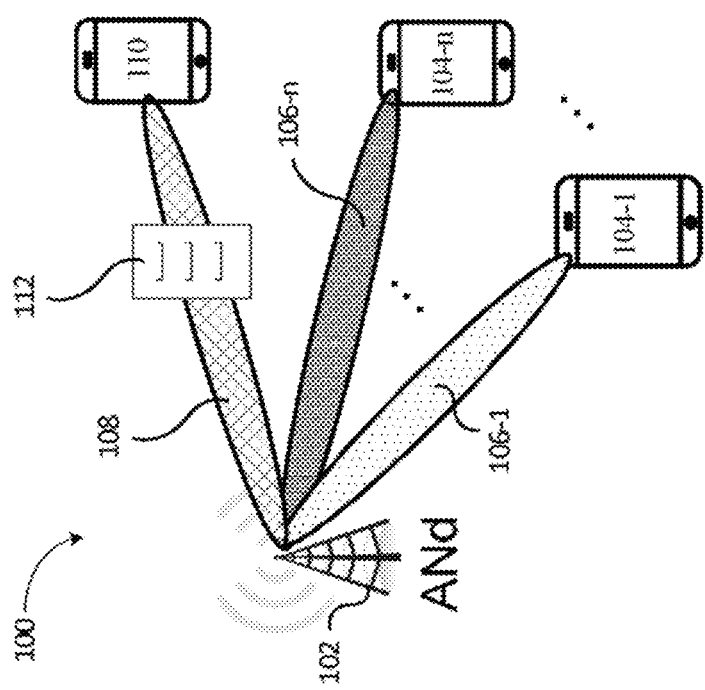
FIG. 1 illustrates an exemplary cell in a wireless communication network incorporating aspects of the disclosed embodiments.

FIG. 1 illustrates an exemplary cell 100 in a wireless communication system. The cell 100 includes a plurality of user nodes 104-1 through 104-n and 110, connected to a serving access node 102 through radio links 106-1 through 106-n and 108. For the purposes of the description herein the user nodes 104-1 through 104-n and 110 will generally be referred to as user nodes 104, while the radio links 106-1 through 106-n and 108 will be referred to as radio links 106.

The cell 100 may be based on any of the currently available wireless communication standards, such as long term evolution (LTE), or may use a future radio access technology. User nodes 104-1 through 104-n, and 110, connected to the access node 102 may be any of various types of mobile communication devices, such as a cell phone, a smart phone, a tablet, a phablet, notebook computer, automobile, etc. Radio links 106-1 through 106-n, and 108, are logical connections between each user node 104-1 through 104-n, 110, and the serving access node 102, and are maintained by exchanging control information between the serving access node 102 and the connected user nodes 104-1 through 104-n, 110.

In conventional wireless networks the radio channels, referred to as control channels, used for exchanging control information do not employ techniques such as precoding to improve the spectral efficiency. So in crowed cells 100 control information can limit the number of user nodes 104-1 through 104-n, 110 that can be connected or erode the radio resources available for payload data. As will be discussed further below, precoding can improve the spectral efficiency of control channels. However reliable precoding requires channel sounding that can also be limited by available radio resources. Channel sounding is the process of transmitting known pilots that may be used to estimate or determine conditions or properties of the radio links 106-1 through 106-n, and 108.

Each radio link 106-1 through 106-n and 108 may be in one of two possible states or conditions. When there is a clear line of sight (LoS) between a user node 104 and the serving access node 102, or when there are no significant obstructions affecting the radio link 106, the radio link 106 is in a LoS condition or state. When the radio path 108 between the serving access node 102 and a user node 110 is obstructed, such as when there is a building or other obstruction 112 interfering with the radio link 108, the radio link 108 is in a non-line of sight (NLoS) condition or state. In either state, LoS or NLoS, the radio links 106, 108 are formed and managed by the serving access node 102 through the exchange of control information with the connected user nodes 104, 110.

Properties of a LoS radio link may be exploited to reduce pilot transmission and improve spectral efficiency of the control channels used to send downlink control information, which is control information sent from the access node 102 to each user node 104-1 through 104n and 110. As the number of user nodes 104-1 through 104-n increases, the amount of control information required to control and coordinate the user nodes 104-1 through 104-n and 110 increases proportionally thereby reducing the amount of radio resources available for payload data.

Figure 2:
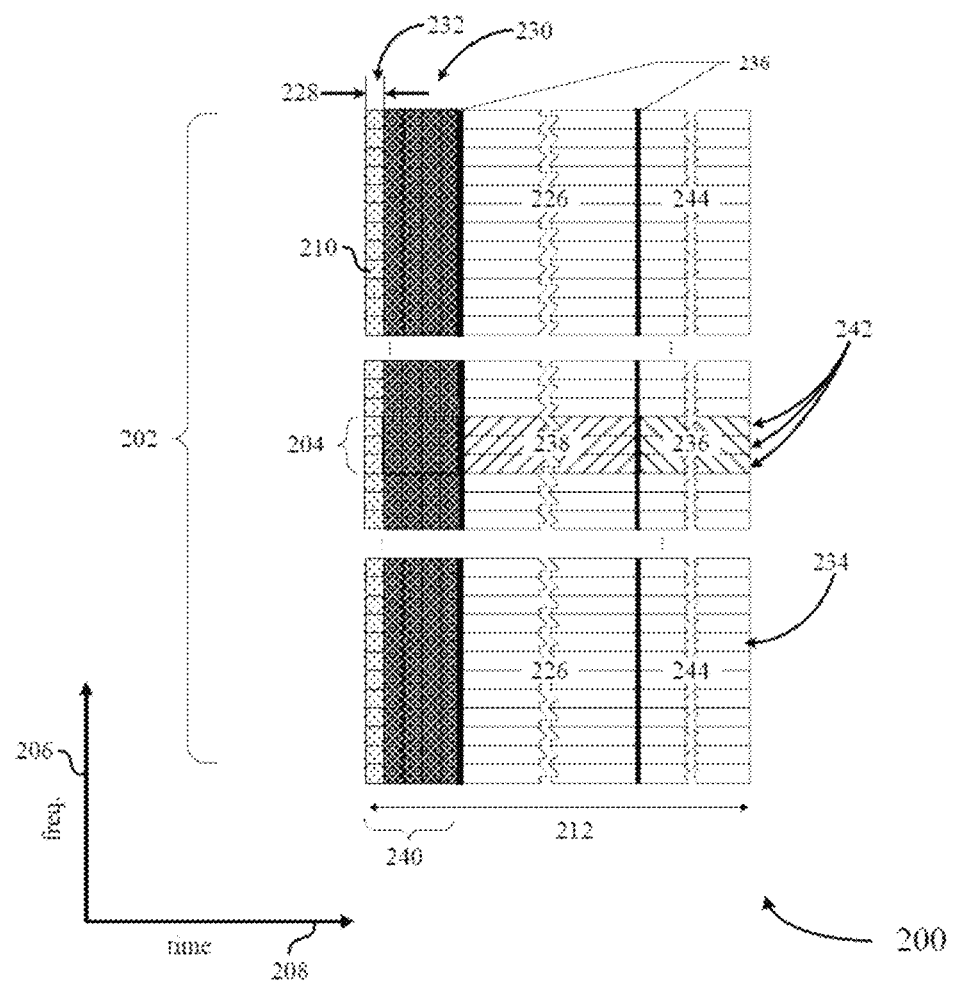
FIG. 2 illustrates an exemplary radio frame structure for managing radio resources in a wireless communication system incorporating aspects of the disclosed embodiments.

FIG. 2 illustrates an exemplary radio frame structure 200 appropriate for managing radio resources in a wireless communication system, such as the cell 100 described above. The exemplary radio frame 200 has dimensions of time, increasing to the right along a horizontal axis 208, and frequency measured along a vertical axis 206. The radio frame structure 200 has a duration in time of a frame period 212 and spans a frequency band or range of frequency resources 202. The frequency band 202 is divided into a number of separate frequency resources represented by horizontal stripes such as the horizontal stripe indicated by numeral 234. These frequency resources 234 represent the smallest individually schedulable portion of the frequency band 202. For example in an orthogonal frequency division multiple access (OFDMA) type wireless systems such as LTE, a frequency resource would be associated with a subcarrier frequency.

In the time domain along the horizontal axis 208 the frame period 212 is divided into a number of symbol periods 228, such as forty-five symbol periods. The smallest individually schedulable portion of the radio resources encompassed by the radio frame 200 is referred to herein as a resource element, or a symbol, and is depicted by squares, such as the square indicated by numeral 210, within the radio frame. Each resource element 210 spans one frequency resource 234 in frequency and one symbol period 232 in time and may be configured to carry one or more symbols, such as a complex valued scalar quadrature amplitude modulated (QAM) symbol as is used in OFDMA type wireless systems.

The radio frame 200 includes guard periods 236 to separate uplink and downlink transmissions. Most of the radio resources or resource elements in the radio frame 200 are allocated for exchanging downlink 226 and uplink 244 payload data between the serving access node 102 and the connected user nodes 104, 110.

A portion of the radio resources 240 of the exemplary radio frame 200 are allocated for channel sounding or pilot symbol transmission. Channel sounding refers to the practice of transmitting known reference symbols, also referred to as pilots, in predefined or agreed upon resource elements for the purpose of estimating or determining properties of a radio link 106-1 through 106-n and 108. Many modern wireless networks have multiple antennas available at the transmitter and/or receiver that allow multi-input multi-output (MIMO) techniques to be used to improve spectral efficiency of radio transmissions. MIMO techniques, such as precoding, require accurate and up to date channel state information at the transmitter (C SIT) for reliable information exchange. Moreover, the CSIT needs to be obtained over the full frequency band 202 being used for downlink transmissions.

To support collection of CSIT, the radio frame structure 200 allocates a portion of the radio frame 230 for wideband pilot transmission. Wideband pilot transmission, also referred to as wideband beacons, are sets of pilots that span the full frequency band 202 or set of frequency resources 234 that will be used for downlink data transmission. As will be discussed further below, these radio frames 230 for wideband pilot transmission, also referred to as wideband beacons 230, are scheduled to user nodes 104-1 through 104-n and 110 that will be receiving channel based precoded downlink control signals.

In certain embodiments it may be desirable to conserve sounding resources by allocating reduced sets of pilots to certain user nodes. These reduces sets of pilots, referred to herein as narrowband beacons, do not span the full frequency band 202 and may be transmitted on frequency resources different than those being used for downlink transmissions. For illustrative purposes, the exemplary radio frame structure 200 allocates narrowband beacons during symbol period 232. However in certain embodiments it may be advantageous to schedule narrowband beacons in other resource elements in the radio frame.

Support for exchange of control information is provided in the exemplary radio frame structure 200 by allocating a portion of the radio resources or resource elements 210 as a control channel 204. A control channel 204 is a predetermined or agreed upon portion of the radio resources used for exchanging control information between user nodes 104-1 through 104-n and 110, and the serving access node 102 and may span one or more frequency resources 242, such as the three frequency resources 242 illustrated in the exemplary control channel 204.

The control channel 204 allocates resources for both wideband beacons 230 and narrow band beacons 232. Downlink control information is transmitted in a first portion 238 of the control channel 204 and uplink control information is transmitted in a second portion 236 of the control channel 204. The exemplary control channel 204 is provided as an aid to understanding only and those skilled in the art will readily recognize that other control channel layouts may be advantageously employed without departing from the spirit and scope of the present disclosure.

Wideband beacons include a set of pilots which are illustrated in the exemplary radio frame structure 200 as the symbol periods indicated by numeral 230. These wideband beacons 230 allow a transmitter to send a set of uplink pilots 230 on all or most subcarriers 234 of the frequency band 202 that will be used for subsequent downlink control transmissions. Wideband beacons include a plurality of pilots that span all frequency resources 234 being used for transmission of control information 242 or data and allow generation of accurate channel estimates appropriate for channel based precoding or other methods of improving spectral efficiency of the radio transmissions. However, this advantage comes at the cost of using a large portion of the channel sounding resources 240 for channel estimation. In a densely populated cell 100 there may not be enough channel sounding resources 240 available to allocate wideband beacons to all user nodes 104-1 through 104-n and 110 connected to a serving access node 102.

Figure 3:
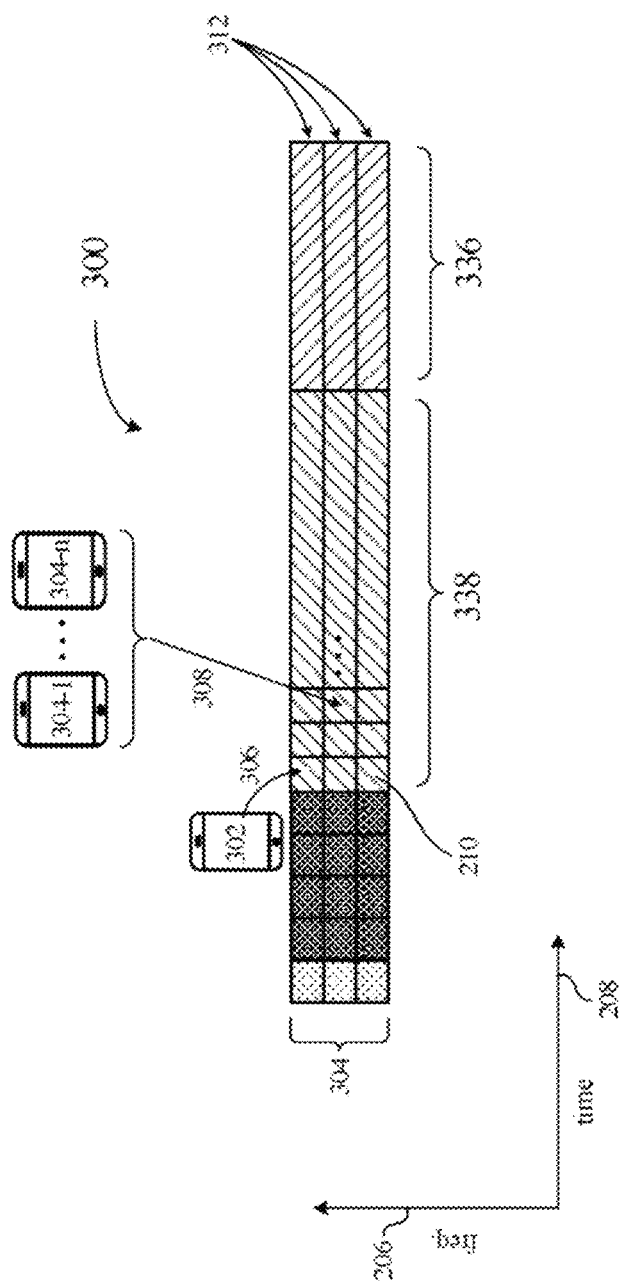
FIG. 3 illustrates a control channel layout configured for transmitting non-precoded control information in a wireless communications system incorporating aspects of the disclosed embodiments.

FIG. 3 illustrates a control channel layout 300 configured for transmitting downlink control information 338 in a wireless communications system. The control channel layout 300 is appropriate for use as a control channel, such as the control channel 204 illustrated in the exemplary radio frame 200 described above.

Similar to the conventions of FIG. 2 the control channel layout 300 has dimensions of time measured along the horizontal axis 208 and frequency along the vertical axis 206 and includes resource elements represented as squares such as the square indicated by numeral 210. Downlink control information is sent in a first portion 338 of the control channel 304 followed by uplink control information 336.

Conventional wireless communication systems based on current wireless standards such as LTE, do not use precoding, also referred to as beamforming, when transmitting downlink control information 338. In a non-precoded control channel 300 resource elements 306, 308, include only a single set of control data. The control information carried by the resource element 306 may be targeted to a single user node 302. Alternatively, the single set of control information in a resource element 308 may be broadcast to more than one user node 304-1 through 304-n. However, in a non-precoded control channel 300 all user nodes 304-1 through 304-n will receive the same control information.

Multiple antennas in MIMO systems exploit multiple signal paths between the transmitter and receiver. By applying different weights or gains to each signal path, the spatial diversity provided by the multiple signal paths may be exploited to maximize signal power at the intended receiver. This technique, referred to as precoding or beamforming, improves the spectral efficiency of the radio link 106-1 through 106-n and 108, allowing multiple sets of data to be multiplexed onto a single resource element 210 such that each user node 104-1 through 104-n and 110 may extract its own data from the multiplexed signal.

The sets of weights or gains, referred to herein as precoding vectors, may be determined using channel estimates based on CSIT. Precoding vectors determined based on channel estimates are referred to herein as channel based precoding vectors or channel based precoding, and rely on accurate and up to date CSIT for reliable data transmission. Obtaining the accurate and up to date CSIT comes at the cost of transmitting a relatively large number of uplink pilots.

Figure 4:
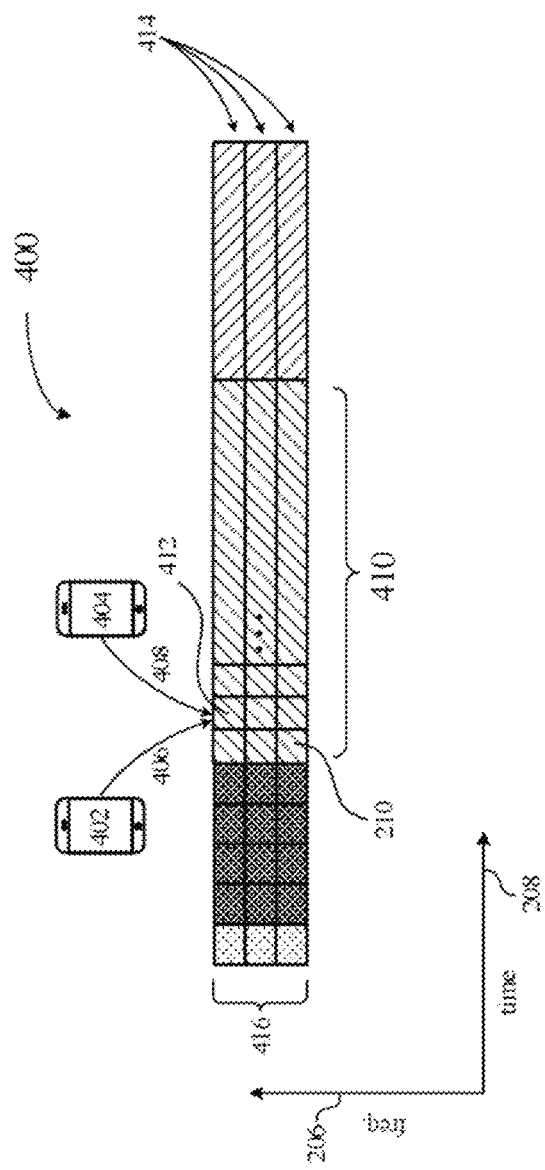
FIG. 4 illustrates an exemplary control channel layout employing channel based precoding incorporating aspects of the disclosed embodiments.

FIG. 4 illustrates an exemplary control channel layout 400 employing channel based precoding for transmission of downlink control information 410. The control channel layout 400 is appropriate for use in the control channel 204 illustrated in the exemplary radio frame 200 described above and with reference to FIG. 2. Similar to the conventions of FIG. 2 the control channel layout 400 has dimensions of time measured along the horizontal axis 208 and frequency measured along the vertical axis 206 and includes resource elements represented by squares such as the square indicated by numeral 210.

The exemplary control channel layout 400 employs channel based precoding to improve the spectral efficiency of the downlink control signals 410. Channel based precoding is used to multiplex multiple sets of data 406, 408 intended for different user nodes 402, 404 onto a single resource element 412. This is possible when spatial signatures of the receiving user nodes 402, 404 have sufficient diversity to allow separation of the multiplexed data 406, 408 at the receiving user nodes 402, 404. Accurate and up to date CSIT over all frequency resources 414, also sometimes referred to as the allocation band, used for downlink transmission is necessary to determine suitable channel based precoding vectors that will allow data multiplexing. Obtaining and maintaining this CSIT relies on wideband beacons which include pilots that span all frequency resources 414 of the control channel 416.

Improving the spectral efficiency of the control channels as described above with the exemplary control channel layout 400 allows an access node 102 to serve greater numbers of user nodes 104-1 through 104-n and 110 without eroding resources available for payload data. However, the use of channel based precoding consumes significant sounding resources.

When a radio link 106 is in a line of sight (LoS) state or condition, i.e. there are no significant obstructions between the transmitter and receiver, it is possible to select suitable precoding vectors based on the location or relative position of the user node 104. Precoding vectors selected based on the position or location of a user node 104 are referred to herein as position based precoding vectors and the precoded signals or precoding generated with position based precoding vectors is referred to herein as position based precoding.

Position based precoding recognizes that in a LoS radio link, knowledge of the angle of arrival (AOA) of an uplink signal arriving at the serving access node 102 from a respective user node 104, may allow efficient estimation of the precoding vectors required for precoded downlink transmission. The uplink angle of arrival used for position based precoding may, for example, be estimated by using multiple signal classification (MUSIC) algorithms which are based on spatial covariance estimation followed by computation of the noise eigenvectors. A synthesized channel matrix may then be determined by synthesizing a multi-user multiple-input-single-output channel matrix comprising only the line-of-sight paths.

Alternatively selection of the precoding vectors for position based precoding may be based on knowledge of the absolute physical locations of the user node 104 and the access node 102. Determination of the AOA or position based precoding can be determined using narrowband beacons having few pilots or by other out of band means thereby resulting in a reduction of the uplink sounding resources 240 or pilots required by position based precoding as compared to the wideband beacons 230 used for channel based precoding.

Position based precoding schemes may use narrowband beacons made up of a reduced set of one or more pilots having frequencies, or using frequency resources, that may be different than the frequency resources allocated for the downlink control data transmission. Since the position of a user node 104 may be obtained with few pilots, or in certain embodiments with a single pilot, use of position based precoding results in improved spectral efficiency of the downlink control channels 204 without transmission of wideband beacons 230 thereby reducing the sounding resources required for transmission of downlink control information. Therefore, position based precoding allows an increased number of user nodes 104 to take advantage of precoded downlink control channels without increasing the radio resources used for channel sounding.

Figure 5:
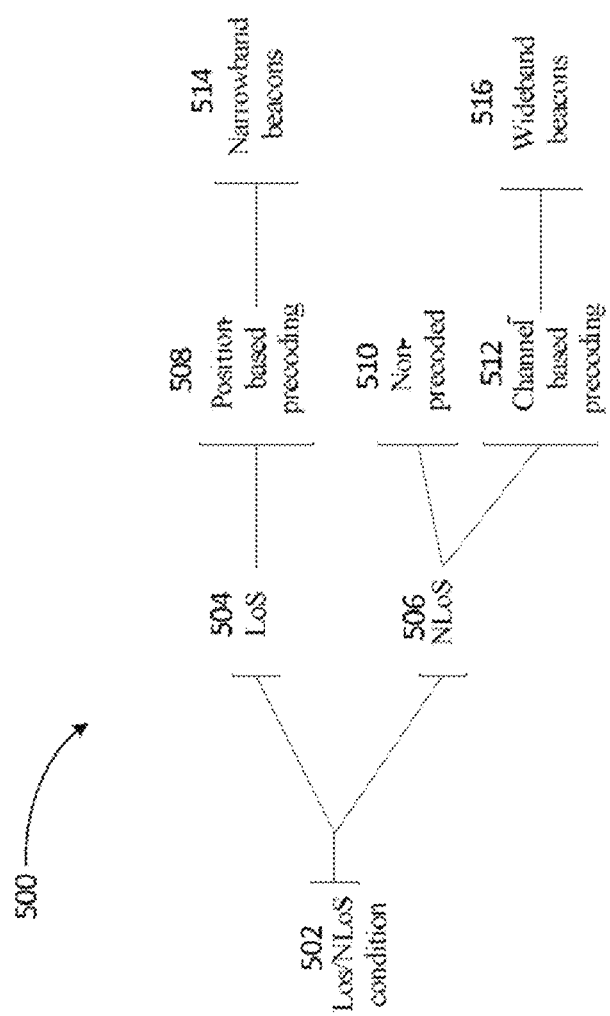
FIG. 5 illustrates a block diagram of an exemplary method for selecting uplink pilots incorporating aspects of the disclosed embodiments.

FIG. 5 illustrates a block diagram of an exemplary embodiment of a method 500 for selecting uplink pilots based on the LoS/NLoS state of a user node. The LoS or NLoS state of a user node 104 refers to the LoS or NLoS state of the radio link 106 connecting the user node 104 to the serving access node 102. The state of a user node 104 may be used to optimize allocation of control channel resources to user nodes in a way that conserves uplink pilot resources. Control channel resources can be grouped into non-precoded resources and precoded resources, where the precoding of the precoded downlink control channel resources may be either channel based precoding or position based precoding.

The method 500 begins by determining the LoS or NLoS condition of a user node and assigning the user node to a LoS state 504 or NLoS state 506 based on the determination 502. When a user node is in the LoS state 504, the user node may be assigned to a position based precoded downlink control channel 508 and allocated 514 narrow band beacons, or a reduced set of uplink pilots. When the user node is in a NLoS state 506, position based precoding is not available and the NLoS user node 506 may be assigned to a non-precoded downlink control channel 510. Alternatively the NLoS user node may be assigned to a channel based precoded downlink control channel 512. When assigned 512 to a channel based precoded downlink control channel the user node is allocated 516 wideband beacons.

In certain embodiments a single control channel may be used to support position based precoded control signals, channel based precoded control signals, and non-precoded control signals all within a single downlink control channel. The exemplary method 500 may be used to allocate sounding resources, or uplink pilots, to each user node based on the LoS/NLoS state of the user node and the type of encoding being used for the associated downlink control signals.

Figure 6:
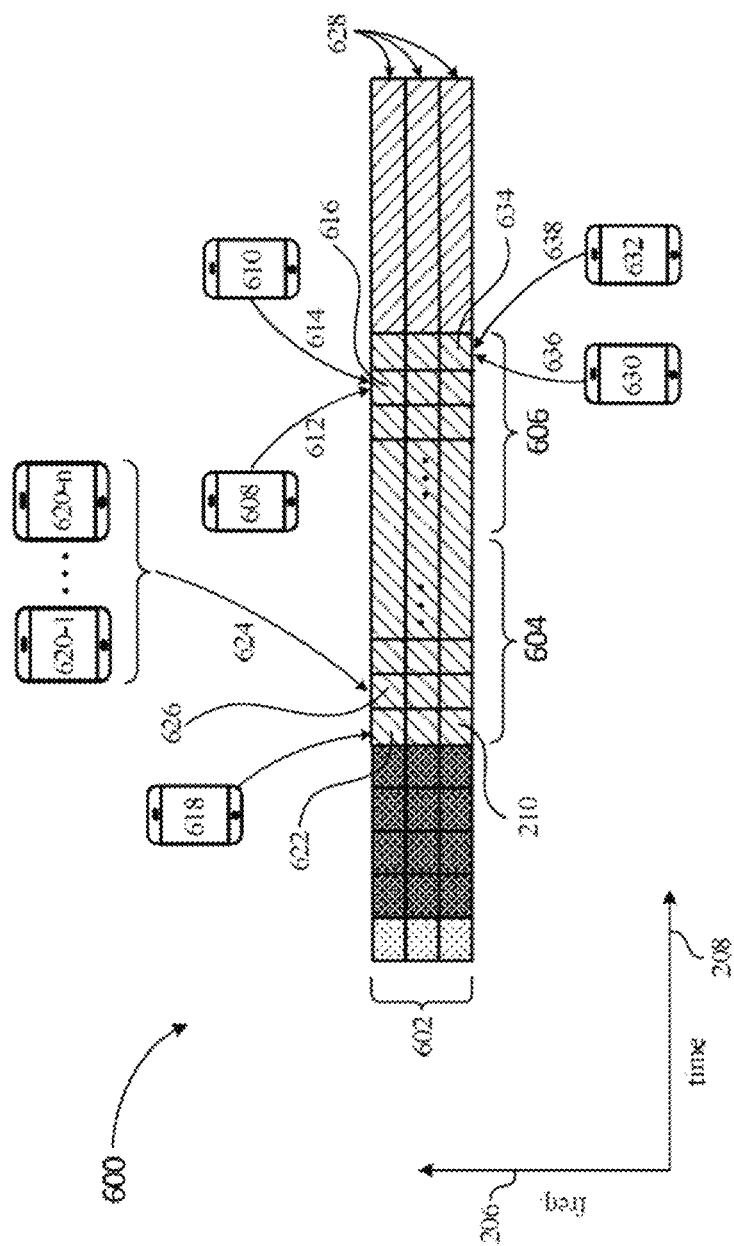
FIG. 6 illustrates an exemplary downlink control channel layout for transmitting both non-precoded and precoded downlink control information incorporating aspects of the disclosed embodiments.

FIG. 6 illustrates an exemplary embodiment of a downlink control channel layout 600 appropriate for supporting both non-precoded downlink control signals 604 as well as precoded downlink control signals 606, where the precoded downlink control signals 606 may use either position based precoding or channel based precoding. The exemplary control channel layout 600 is appropriate for use as a control channel 204 in the exemplary radio frame 200 described above and with reference to FIG. 2.

Similar to the conventions of FIG. 2 the control channel layout 600 is illustrated with dimensions of time increasing to the right along the horizontal axis 208 and frequency increasing upwards along the vertical axis 206. The time-frequency resources are divided into resource elements represented by squares such as the square indicated by numeral 210. The exemplary downlink control channel layout 600 has a frequency band 602 spanning a number of frequency resources 628 which in certain embodiments may be referred to as subcarriers. The exemplary downlink control channel layout 600 is illustrated as including three frequency resources 628, however those skilled in the art will readily recognize that the downlink control channel 600 may include more or fewer than three frequency resources without departing from the spirit and scope of the present disclosure.

Further, the exemplary downlink control channel layout 600 is illustrated with the precoded radio resources or control signals 606 being sent later than the non-precoded 604 control signals. Alternatively the downlink control channel layout may be configured to have the precoded control signals 606 sent before the non-precoded control signals 604 or the precoded control signals 606 may be comingled with the non-precoded control signals 604.

A non-precoded control signal 622 may contain only a single set of data which may be sent to a single user node 618. Alternatively the information or data 624 in a non-precoded control signal 626 may be broadcast to a plurality of user nodes 620-1 through 620-n. Precoded control signals 616, 634 may have multiple sets of control information or data, 612, 614 and 636, 638 respectively, multiplexed onto a single radio resource using either channel based precoding techniques or position based precoding techniques.

Precoded control signals 616 may include one set of control information 612 for a first user node 608 and a second set of control information 614 for a second user node 610. Alternatively, a precoded resource element 634 may contain a control signal 636 for one user node 630 and a data signal 638 for another user node 632.

User nodes 608, 610 that are in a LoS state, which means the radio link 106 connecting the user nodes 608, 610 with the serving access node 102 is in a LoS radio link, may both be assigned to the same precoded control signal 616. When multiple user nodes 608, 610 are both in a LoS state, two sets of data, one for each user node 608, 610 may be multiplexed onto the same precoded control signal 616 using position based precoding techniques. The corresponding location based precoding vectors for the user nodes 608, 610 are determined based on the position or physical location of the user nodes 608, 610 and/or their relative positions with respect to the serving access node 102.

The position of the user nodes 608, 610 may be obtained from one or more uplink pilots configured as narrowband uplink beacons or through other appropriate means of determining position information. Uplink pilots used for determination of position need not span the frequency resources 628 used for the downlink control channel 602 thereby allowing greater flexibility in sounding resource assignment. When user nodes 630, 632 are in a NLoS state, and accurate up to date CSIT is available for the user nodes 630, 632, channel based precoding may be used to multiplex different data, 636 and 638, targeted individually to each user node 630, 632 onto a single resource element 634.

Figure 7:
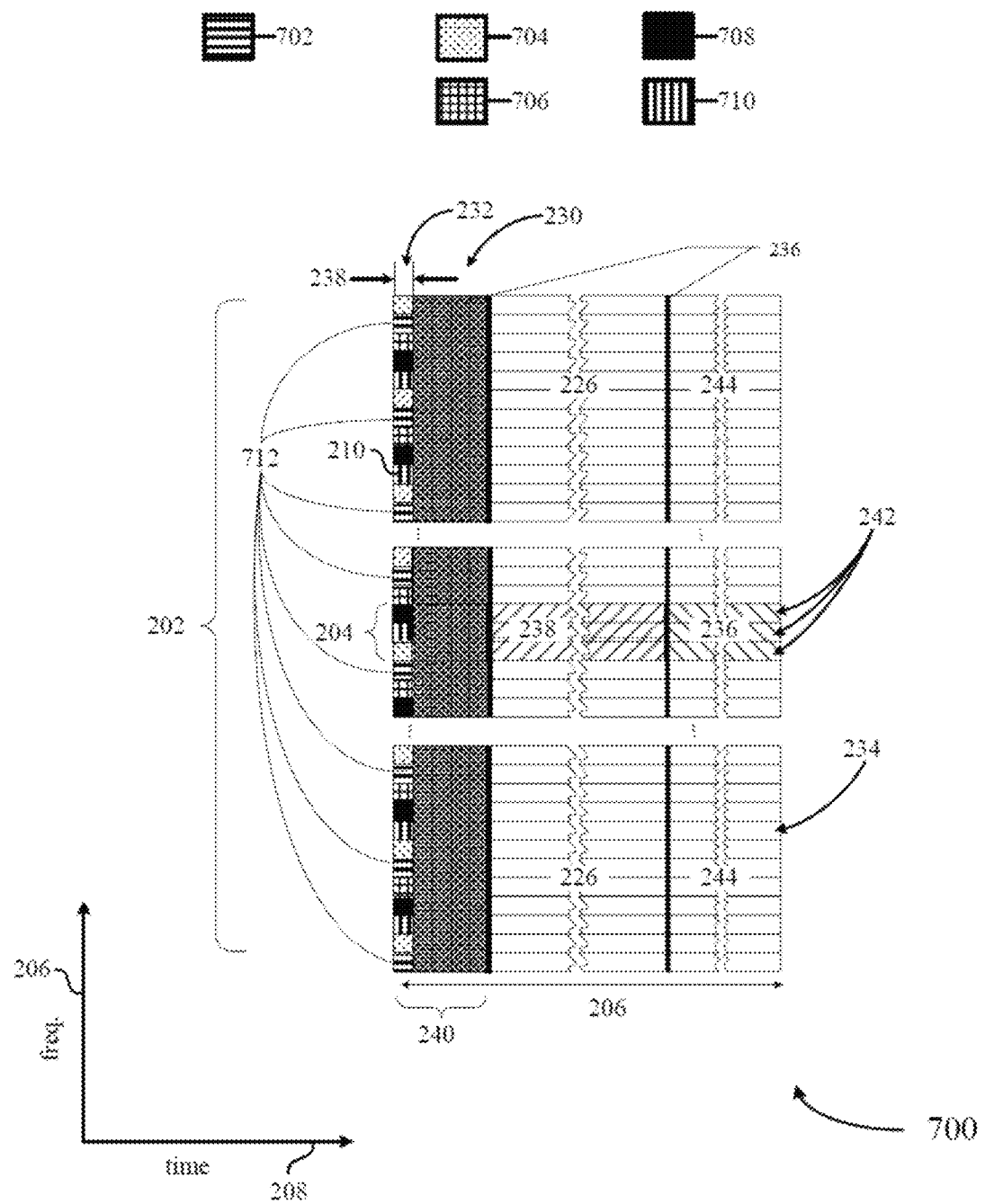
FIG. 7 illustrates an exemplary uplink pilot scheme for scheduling pilots in a radio frame incorporating aspects of the disclosed embodiments.

FIG. 7 illustrates an exemplary uplink pilot scheme 700 as may be used for allocating uplink pilot resources 240. As an aid to understanding the exemplary uplink pilot scheme is illustrated using the radio frame structure 200 described above and illustrated in FIG. 2. The exemplary uplink pilot scheme 700 is presented as an aid to understanding only, and those skilled in the art will readily recognize that other schemes for scheduling uplink pilots in other types of radio frames may be advantageously employed without departing from the spirit and scope of the present disclosure.

The exemplary scheme 700 shows a scheme for scheduling five narrowband uplink beacons or sets of uplink pilots 702, 704, 708, 710 for five user nodes (not shown) within a single symbol period 238. The reference symbols or pilots associated with each narrowband uplink beacon 702, 704, 708, 710 are illustrated by like shading where all pilots associated with the same narrowband uplink beacon are shaded with the same pattern.

For example the first narrowband beacon or set of pilots 702 includes the five pilots 712 which are all shaded using the same shading pattern 702, while the remaining uplink beacons 704, 706, 708, 710 are illustrated with different shading patterns. The scheme 700 shows a pilot scheme where the uplink pilots associated with each narrowband uplink beacon 702, 704, 708, 710 are evenly distributed across the frequency band 202 of the radio frame 200. Alternatively, the pilots may be distributed according to a different scheme, where any distribution that allows determination of a relative position, or absolute location of the user node transmitting the narrowband uplink beacon, may be advantageously used. Further, the exemplary scheme illustrates five narrowband uplink beacons, however more or less than five narrowband uplink beacons or sets of pilots may be used.

The one or more pilots 712 included in the first narrowband uplink beacon 702 span frequencies that are different than the frequency band, or frequency resources 242, of the control channel 202. For user nodes that have a NLoS radio link 108 or that are not able to use position based precoding, wideband beacons 230 may be scheduled and used to determine channel based precoding vectors.

The exemplary radio frame layout 700 employs a control channel 204 scheme where control information is transmitted on resource elements 238 within the control channel 204 and payload data is transmitted within a different set of resource elements 226. It may be advantageous in certain embodiments to form a hybrid channel matrix that includes both measured channels and channel estimates along with position information. The position information may be obtained through narrowband beacons or through other out of band techniques, while the measured channel or channel estimates may be obtained through wideband beacons. The hybrid channel matrices may be maintained by the access node 102 or by some other network entity, such as a centralized control entity or cloud computing unit (not shown).

The hybrid channel matrix can then be used for calculating precoders or precoding vectors for beamforming in order to transmit payload data and control information simultaneously within the same set of resource elements. This technique provides more flexibility in scheduling as compared to schemes where control information is allocated to different resources than the resources being used for payload data.

Figure 8:
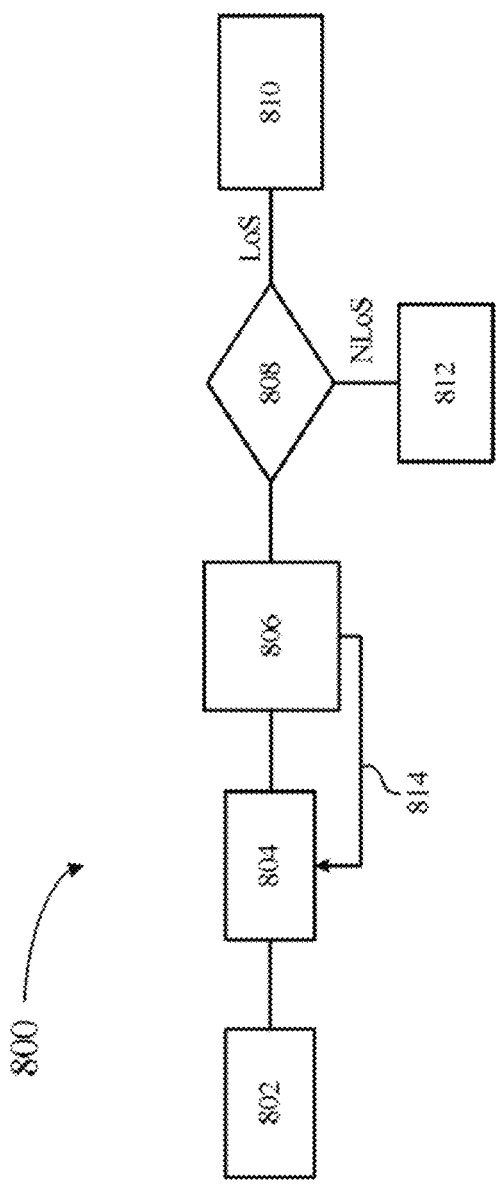
FIG. 8 illustrates a flowchart of an exemplary method for precoding downlink control channel data based on a radio environment map incorporating aspects of the disclosed embodiments.

Referring now to FIG. 8 there can be seen a flowchart of an exemplary method 800 for precoding downlink control channel data based on a radio environment map. A serving access node sends 802 a pilot request to the user nodes to schedule one or more of the user nodes to send uplink pilots or narrowband uplink beacons to the access node. The pilot requests can be sent for example through a broadcast message sent to all user nodes, or alternatively the pilot request can be transmitted separately to each user node. The pilot request may schedule narrowband uplink beacons to be transmitted either periodically or aperiodically and continue for a specified or predetermined time period.

In certain embodiments it is advantageous to have a user node determine when additional channel sounding is required and send a request for uplink pilots to the access node requesting that additional uplink pilots be scheduled. For example a request for uplink pilots may be sent when a user node detects that the period since the last uplink pilots were sent exceeds a desired threshold value. The user node may then send a request for uplink pilots to the serving access node requesting that narrowband uplink beacons be scheduled for the user node. When scheduling narrowband uplink beacons for a user node, the access node may use a downlink control signal or pilot request sent within a non-precoded portion of the control channel.

The transmitted pilot request may include assignment of the time-frequency, or time-frequency-code, resource elements that should be used for transmitting the narrowband uplink beacons and may also include an indication of the associated transmit power. In embodiments where a user node is equipped with multiple antennas the serving access node may specify in the pilot request which antenna element or elements should be used when transmitting the uplink pilots.

After receiving the pilot request each user node transmits 804 one or more pilots configured as a narrowband uplink beacon to the serving access node. Information generated from the received uplink pilots is then used by the serving access node to maintain 806 a radio environment map (REM). The access node may maintain the REM by tracking the positions and LoS/NLoS state of the user nodes. Alternatively, the REM may be maintained 806 by combining historical information about user node positions and LoS/NLoS state with current measurements to create a statistical model. The LoS/NLoS state of the user nodes may be determined through any appropriate technique such as inferring the LoS condition through pattern matching of the channel frequency response estimated using the uplink beacons, or a statistical test of the Rice-Factor for the radio link, as well as other LoS condition determination algorithms or methods.

In embodiments where wideband beacons are available, the wideband beacon information may also be used to maintain the REM. The REM may be maintained by repeatedly receiving 814 uplink beacons and updating 806 the REM based on each newly received uplink beacon.

The REM can then be used to determine 808 the LoS/NLoS state of each user node. Position based precoded downlink control channel resources are then assigned 810 to user nodes which are in a LoS state, and non-precoded downlink control channel resources are assigned 812 to user nodes that are in a NLoS state. Alternatively, user nodes that are in a NLoS state may be allocated wideband uplink beacons and use channel based precoded downlink control channel resources. When the LoS/NLoS state of a user node changes, such as from LoS to NLoS or vice-versa, the access node may communicate the new downlink control channel assignment, such as precoded or non-precoded to the user node either through a broadcast message or through downlink control information specific to the user node.

Figure 9:
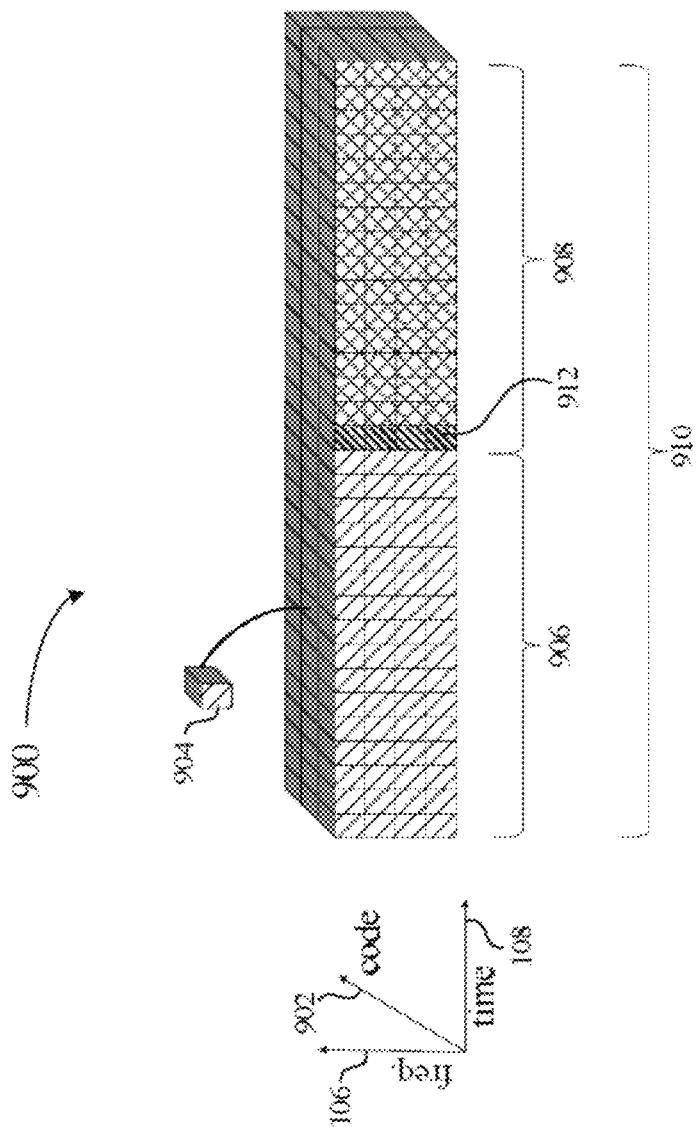
FIG. 9 illustrates an exemplary downlink control channel layout incorporating precoded and non-precoded radio resources incorporating aspects of the disclosed embodiments.

FIG. 9 illustrates an exemplary control channel layout 900 incorporating precoded 906 and non-precoded 908 radio resources. In certain embodiments the wireless network may be configured to employ a technique referred to herein as code division to divide the available radio resources into a three dimensional space. The exemplary three dimensional control channel layout 900 is illustrated with dimensions of time increasing to the right along a horizontal axis 208, frequency increasing upwards along a vertical axis 206, and different orthogonal codes distributed along a third orthogonal code axis 902. In the illustrated control channel layout 900 each resource element 904 represents the smallest individually schedulable portion of the three dimensional radio space having dimensions of time, frequency, and code.

The exemplary control channel layout 900 employs precoding in a first portion 906 of the radio resources 910 and uses non-precoded transmission in a second portion 908 of the radio resources. Alternatively, the order of the precoded first portion 906 and non-precoded second portion 908 of the data can be reversed or intermixed. The downlink control channel layout 900 also provides a set of resource elements allocated for sending broadcast data 912 to all user nodes being served in a cell.

Figure 10:
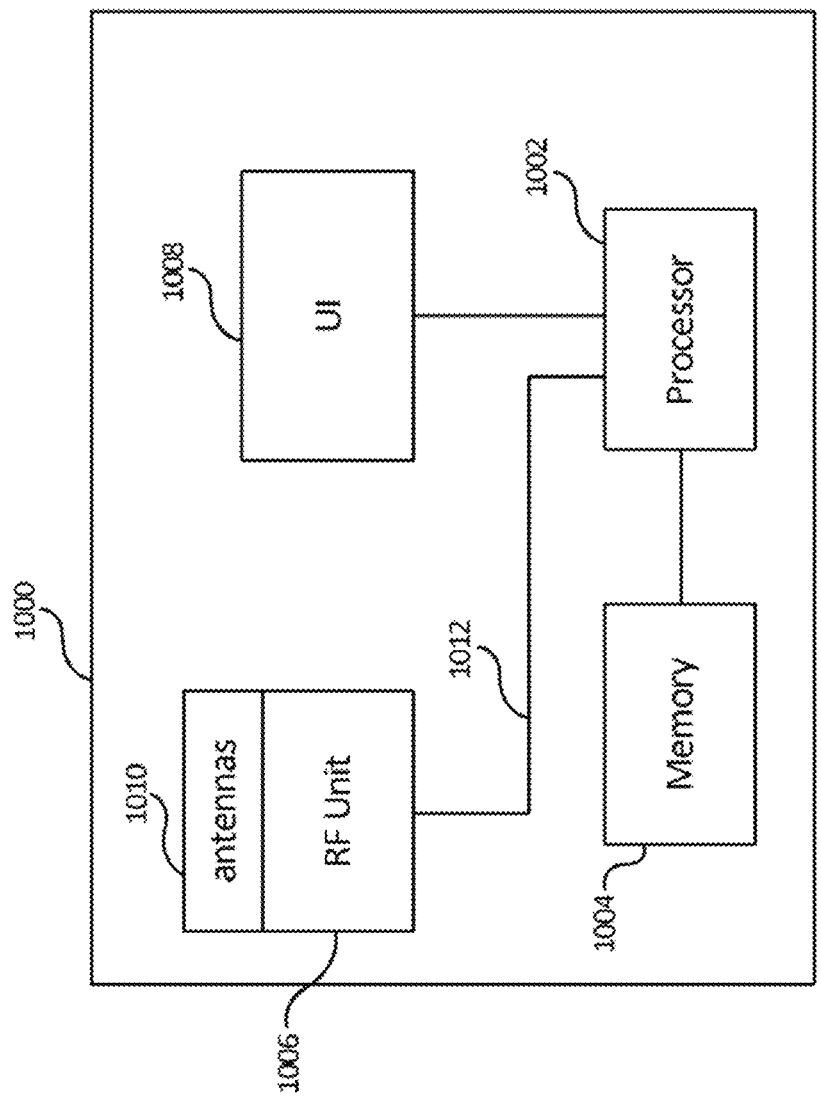
FIG. 10 illustrates a block diagram of an exemplary transceiver apparatus incorporating aspects of the present disclosure.

FIG. 10 illustrates a block diagram of an exemplary transceiver apparatus 1000 appropriate for implementing aspects of the disclosed embodiments. The transceiver apparatus 1000 includes a processor or computing hardware 1002 coupled to a computer memory 1004, a radio frequency (RF) unit 1006 and a user interface (UI) 1008. The transceiver apparatus 1000 is appropriate for use in a wireless network and may be configured for use as a user node 104-1 through 104-n and 110, which in certain embodiments may be any of various types of mobile computing devices, including various types of wireless communications user equipment such as cell phones, smart phones, tablet devices, and wirelessly connected automobiles. Alternatively the transceiver apparatus 1000 may be configured as an access node or base station in a wireless communication network.

In certain embodiments such as for an access node or base station, the UI 1008 may be removed from the transceiver apparatus 1000. When the UI 1008 is removed the transceiver apparatus 1000 may be administered remotely or locally through a wireless or wired network connection (not shown).

The processor 1002 may be a single processing device or may comprise a plurality of processing devices including special purpose devices, such as for example, digital signal processing (DSP) devices, microprocessors, graphics processing units (GPU), specialized processing devices, or general purpose computer processing unit (CPU). The processor 1002 often includes a CPU working in tandem with a DSP to handle signal processing tasks. The processor 1002 may be configured to implement any of the methods for access nodes 102 or methods for transmitting control information described herein.

The processor 1002 is coupled to a memory 1004 which may be a combination of various types of volatile and non-volatile computer memory such as for example read only memory (ROM), random access memory (RAM), magnetic or optical disk, or other types of computer memory. The memory 1004 stores computer program instructions that may be accessed and executed by the processor 1002 to cause the processor 1002 to perform a variety of desirable computer implemented processes or methods such as the methods for transmitting pilots and control information as described herein.

The program instructions stored in memory 1004 are organized as sets or groups of program instructions referred to in the industry with various terms such as programs, software components, software modules, units, etc. Each module may include a set of functionality designed to support a certain purpose. For example a software module may be of a recognized type such as a hypervisor, a virtual execution environment, an operating system, an application, a device driver, or other conventionally recognized type of software component. Also included in the memory 1004 are program data and data files which may be stored and processed by the processor 1002 while executing a set of computer program instructions.

The transceiver 1000 includes an RF Unit 1006 coupled to the processor 1002 and configured to transmit and receive RF signals based on digital data 1012 exchanged with the processor 1002 and may be configured to transmit and receive radio signals with other nodes in a wireless network. In certain embodiments, the RF Unit 1006 includes receivers capable of receiving and interpreting messages sent from satellites in the global positioning system (GPS) and work together with information received from other transmitters to obtain positioning information pertaining to the location of the computing device 1000. To facilitate transmitting and receiving RF signals the RF unit 1006 includes an antenna unit 1010 which in certain embodiments may include a plurality of antenna elements. The multiple antennas 1010 may be configured to support transmitting and receiving MIMO signals as may be used for beamforming.

The UI 1008 may include one or more user interface elements such as a touch screen, keypad, buttons, voice command processor, as well as other elements adapted for exchanging information with a user. The UI 1008 may also include a display unit configured to display a variety of information appropriate for a computing device or mobile user equipment and may be implemented using any appropriate display type such as for example organic light emitting diodes (OLED), liquid crystal display (LCD), as well as less complex elements such as LEDs or indicator lamps.

Thus, while there have been shown, described and pointed out, fundamental novel features of the embodiments of the invention as applied to the exemplary embodiments thereof, it will be understood that various omissions, substitutions and changes in the form and details of devices and methods illustrated, and in their operation, may be made by those skilled in the art without departing from the spirit and scope of the presently disclosed embodiments of the invention. Further, it is expressly intended that all combinations of those elements, which perform substantially the same function in substantially the same way to achieve the same results, are within the scope of the embodiments of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. An access node comprising:
   a transceiver configured to receive one or more uplink pilots associated with a user node via a radio link;
   a processor configured to:
      determine, based on the one or more uplink pilots, a location of the user node and whether the radio link is a line of sight radio link or a non-line of sight radio link, and
      when the radio link is a line of sight radio link, determine a position based precoding vector based on the location of the user node, and generate a precoded downlink control signal based on the determined position based precoding vector; and
   wherein the transceiver is configured to transmit the precoded downlink control signal to the user node.

2. The access node according to claim 1, wherein:
   the precoded downlink control signal comprises a set of transmission frequency resources; and
   the one or more uplink pilots comprise a set of sounding frequency resources comprising fewer frequency resources than the set of transmission frequency resources.

3. The access node according to claim 2, wherein the set of transmission frequency resources comprises one or more frequency resources not present in the set of sounding frequency resources.

4. The access node according to claim 1, wherein when the radio link is a non-line of sight radio link, the processor is configured to:
   determine a channel estimate based on the one or more uplink pilots;
   determine a channel based precoding vector based on the channel estimates; and
   precode the precoded downlink control signal based on the channel based precoding vector.

5. The access node according to claim 1, wherein:
   the processor is configured to generate a hybrid channel matrix comprising the location of the user node and a set of channel estimates; and
   the transceiver is configured to transmit a spatially multiplexed radio resource to one or more user nodes, wherein the spatially multiplexed radio resource comprises the precoded downlink control signal and a precoded data signal.

6. The access node according to claim 1, wherein the transceiver is further configured to:
   receive a pilot request from the user node, the pilot request comprising a request to schedule transmission of at least one uplink pilot; and
   send a downlink control signal to the user node, the downlink control signal comprising information for scheduling transmission of the one or more uplink pilots.

7. The access node according to claim 1, wherein the transceiver is configured to transmit, a first downlink control signal comprising information for decoding of the precoded downlink control signal.

8. The access node according to claim 7, wherein the first downlink control signal comprises time-frequency resource assignments and transmit power assignments for the one or more uplink pilots.

9. The access node according to claim 7, wherein the first downlink control signal comprises an indication of an antenna element to be used for transmitting the one or more uplink pilots.

10. The access node according to claim 1, wherein the processor is configured to determine the position based precoding vector based on a synthesized channel matrix comprising one or more line of sight radio links.

11. The access node according to claim 1, wherein:
   when the radio link is a non-line of sight radio link, the processor is configured to schedule a plurality of uplink pilots for the user node, wherein the plurality of uplink pilots comprises a set of transmission frequency resources; and
   the transceiver is configured to transmit a channel based precoded downlink control signal to the user node, and broadcast a non-precoded downlink control signal to a plurality of user nodes.

12. The access node according to claim 1, wherein:
the processor is configured to include in the downlink control signal, an uplink pilot information comprising one or more of an indication of the number of uplink pilots to be transmitted and the radio resources to be used for transmitting the uplink pilots.

13. A method for transmitting control information in an access node, the method comprising:
receiving one or more uplink pilots from a user node via a radio link;
determining, based on the one or more uplink pilots, a location of the user node, and whether the radio link is a line of sight radio link or a non-line of sight radio link;
when the radio link is a line of sight radio link, determining a position based precoding vector based on the location of the user node;
precoding a downlink control signal based on the determined position based precoding vector; and
transmitting the precoded downlink control signal to the user node.

14. The method according to claim 13, wherein:
the precoded downlink control signal comprises a set of transmission frequency resources; and
the one or more uplink pilots comprise a set of sounding frequency resources comprising fewer frequency resources than the set of transmission frequency resources.

15. The method according to claim 13, wherein when the radio link is a non-line of sight radio link, the method further comprises:
determining a channel estimate based on the one or more uplink pilots;
determining a channel based precoding vector based on the channel estimates; and
precoding the precoded downlink control signal based on the channel based precoding vector.

16. The method according to claim 13, further comprising:
generating a hybrid channel matrix comprising the location of the user node and a set of channel estimates; and
transmitting a spatially multiplexed radio resource to one or more user nodes, wherein the spatially multiplexed radio resource comprises a location based precoded downlink control signal and a location based precoded data signal.

17. The method according to claim 13, further comprising:
transmitting a first downlink control signal comprising information for decoding of the precoded downlink control signal.

18. The method according to claim 13, further comprising:
determining the position based precoding vector based on a synthesized channel matrix comprising one or more line of sight radio links.

19. The method according to claim 13, further comprising:
when the radio link is a non-line of sight radio link, scheduling a plurality of uplink pilots for the user node, wherein the plurality of uplink pilots comprises the set of transmission frequency resources, and
transmitting a channel based precoded downlink control signal to the user node, and broadcast a non-precoded downlink control signal to a plurality of user nodes.

20. A non-transitory computer readable storage medium having stored thereon program instructions that, when executed by a processor, cause a device to:
receive one or more uplink pilots from a user node via a radio link;
determine, based on the one or more uplink pilots, a location of the user node, and whether the radio link is a line of sight radio link or a non-line of sight radio link;
when the radio link is a line of sight radio link, determine a position based precoding vector based on the location of the user node;
precode a downlink control signal based on the determined position based precoding vector; and
transmit the precoded downlink control signal to the user node.

* * * * *